(12) United States Patent
Fukushima (10) Patent No.: US 10,461,608 B2
(45) Date of Patent: Oct. 29, 2019

(54) MOTOR HAVING SENSOR FOR DETECTING OPERATING STATE OF BEARING

(71) Applicant: FANUC CORPORATION, Yamanashi (JP)

(72) Inventor: Yuusuke Fukushima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 44 days.

(21) Appl. No.: 15/869,239

(22) Filed: Jan. 12, 2018

(65) Prior Publication Data

US 2018/0233993 A1  Aug. 16, 2018

(30) Foreign Application Priority Data

Feb. 15, 2017 (JP) .................. 2017-026353

(51) Int. Cl.
| | | |
|---|---|---|
| *H02K 11/20* | (2016.01) | |
| *H02K 11/21* | (2016.01) | |
| *H02K 1/18* | (2006.01) | |
| *H02K 5/16* | (2006.01) | |
| *H02K 7/08* | (2006.01) | |

(52) U.S. Cl.
CPC ............ *H02K 11/20* (2016.01); *H02K 1/185* (2013.01); *H02K 5/161* (2013.01); *H02K 7/083* (2013.01); *H02K 11/21* (2016.01)

(58) Field of Classification Search
CPC ........ H02K 11/20; H02K 11/21; H02K 11/24; H02K 11/25; H02K 11/40; H02K 1/185; H02K 1/18; H02K 5/161; H02K 5/16; H02K 5/1672; H02K 5/1732; H02K 5/22; H02K 5/225; H02K 7/083
USPC ............. 310/68 B, 68 C, 68 E, 89, 90, 254.1
See application file for complete search history.

(56) References Cited

U.S. PATENT DOCUMENTS 6,617,713 B1 * 9/2003 Li .................. H02K 11/20
310/52
2012/0183247 A1 * 7/2012 Chamberlin ........... H02K 11/25
384/448

FOREIGN PATENT DOCUMENTS

| CN | 101213436 A | 7/2008 |
|---|---|---|
| CN | 203326816 U | 12/2013 |
| CN | 104380580 A | 2/2015 |
| CN | 205544654 U | 8/2016 |
| JP | 2002199771 A | 7/2002 |
| JP | 200379097 A | 3/2003 |
| JP | 2008131713 A | 6/2008 |

(Continued)

OTHER PUBLICATIONS

English Abstract and Machine Translation for Japanese Publication No. 2015-231295 A, published Dec. 21, 2015, 21 pgs.
English Abstract and Machine Translation for Japanese Publication No. 2008-131713 A, published Jun. 5, 2008, 16pgs.

(Continued)

*Primary Examiner* — Michael Andrews
(74) *Attorney, Agent, or Firm* — Fredrikson & Byron, P.A.

(57) ABSTRACT

A motor includes a stator unit having a stator, a rotor, a first bearing for supporting a first shaft portion of a shaft of the rotor in a first portion of the stator unit, a second bearing for supporting a second shaft portion of the shaft in a second portion of the stator unit, a first sensor for measuring a first parameter related to an operating state of the first bearing in the first portion of the stator unit, and a guide path provided in the stator unit, for guiding a first signal line of the first sensor from the first portion to the second portion.

18 Claims, 10 Drawing Sheets

(56) References Cited

FOREIGN PATENT DOCUMENTS

| JP | 2015231295 A | 12/2015 |
|---|---|---|
| WO | 2014188672 A1 | 11/2014 |

OTHER PUBLICATIONS

English Abstract and Machine Translation for Japanese Publication No. 2003-079097 A, published Mar. 14, 2003, 5 pgs.

English Abstract and Machine Translation for International Publication No. WO JP 20141188672 A1, published Nov. 27, 2014, 47 pgs.

English Abstract and Machine Translation for Japanese Publication No. 2002-199771 A, published Jul. 12, 2002, 25 pgs.

Untranslated Decision to Grant a Patent mailed by Japan Patent Office (JPO) for Application No. JP 2017-026353, dated Sep. 11, 2018, 3 pages.

English machine translation of Decision to Grant a Patent mailed by Japan Patent Office (JPO) for Application No. JP 2017-026353, dated Sep. 11, 2018, 3 pages.

Untranslated Notification of Reasons for Refusal mailed by Japan Patent Office (JPO) for Application No. JP 2017-026353, dated Jul. 24, 2018, 3 pages.

English machine translation of Notification of Reasons for Refusal mailed by Japan Patent Office (JPO) for Application No. JP 2017-026353, dated Jul. 24, 2018, 3 pages.

English Abstract and Machine Translation for Chinese Publication No. 101213436 A, published Jul. 2, 2008, 6 pgs.

English Abstract and Machine Translation for Chinese Publication No. 104380580 A, published Feb. 25, 2015, 31 pgs.

English Abstract and Machine Translation for Chinese Publication No. 205544654 U, published Aug. 31, 2016, 5 pgs.

English Abstract and Machine Translation for Chinese Publication No. 203326816 U, published Dec. 4, 2013, 4 pgs.

\* cited by examiner

MOTOR HAVING SENSOR FOR DETECTING OPERATING STATE OF BEARING

BACKGROUND OF THE INVENTION

1. Field of the Invention

The present invention relates to a motor having a sensor for detecting an operating state of a bearing.

2. Description of Related Art

Motors generally have bearings for supporting shafts. The bearings of the motors are subjected to weight, vibration, etc., during use. The weight and vibration may cause malfunctions such as unusual noise, fixation, etc., in machines (for example, machine tools, industrial machines, etc.), and therefore the motors may fail to operate.

To prevent malfunctions in the bearings of motors, a technique for monitoring an operating state of a bearing is known (for example, Japanese Unexamined Patent Publication (Kokai) Nos. 2008-131713, 2003-79097 and 2015-231295). In the technique, a sensor is attached to or in the vicinity of the bearing, to detect a parameter related to the operating state of the bearing.

SUMMARY OF THE INVENTION

When a sensor is attached to a bearing of a motor, a device (for example, control device, etc.) connected to the sensor may be disposed on a side opposite the bearing (opposite the bearing across a rotor core in the direction of a central axis of a shaft). In this case, an operator has to route a long signal line of the sensor, i.e., has to deal with complicated wiring of the signal line.

An aspect of this disclosure is a motor that includes a stator unit having a stator; a rotor having a rotor core inserted into the stator so as to form a gap, and a shaft including a first shaft portion and a second shaft portion protruding from the rotor core in opposite directions to each other; a first bearing for rotatably supporting the first shaft portion of the shaft in a first portion of the stator unit; a second bearing for rotatably supporting the second shaft portion of the shaft in a second portion of the stator unit; a first sensor for measuring a first parameter related to an operating state of the first bearing in the first portion of the stator unit, the first sensor having a first signal line for outputting the first parameter; and a guide path provided in the stator unit, for guiding the first signal line from the first portion to the second portion.

According to the aspect of the disclosure, the motor includes the guide path for guiding the first signal line of the first sensor from the first portion in which the first bearing is situated to the second portion in which the second bearing is situated. In other words, the first signal line of the first sensor is guided to a side opposite the first bearing (opposite the first bearing across the rotor core in the direction of a central axis of the shaft). Therefore, according to the aspect of the disclosure, when a device to which the first sensor is connected is disposed opposite the first bearing, the length of the signal line an operator has to route is reduced, as compared with a motor having no guide path. This facilitates wiring of the signal line. Even when a device issuing a signal (for example, a rotation detector, a temperature detector, a sensor for measuring an operating state of a bearing on a side opposite the first sensor, etc.) is disposed on a side opposite the first sensor of the motor, a single line can transmit multiple signals, thus facilitating wiring of the signal line.

DETAILED DESCRIPTION OF THE INVENTION

Motors according to embodiments will be described below with reference to the drawings. The same reference numerals indicate similar or corresponding elements, and a duplicate description is omitted. For ease of understanding, the drawings may be on various scales.

Figure 1:
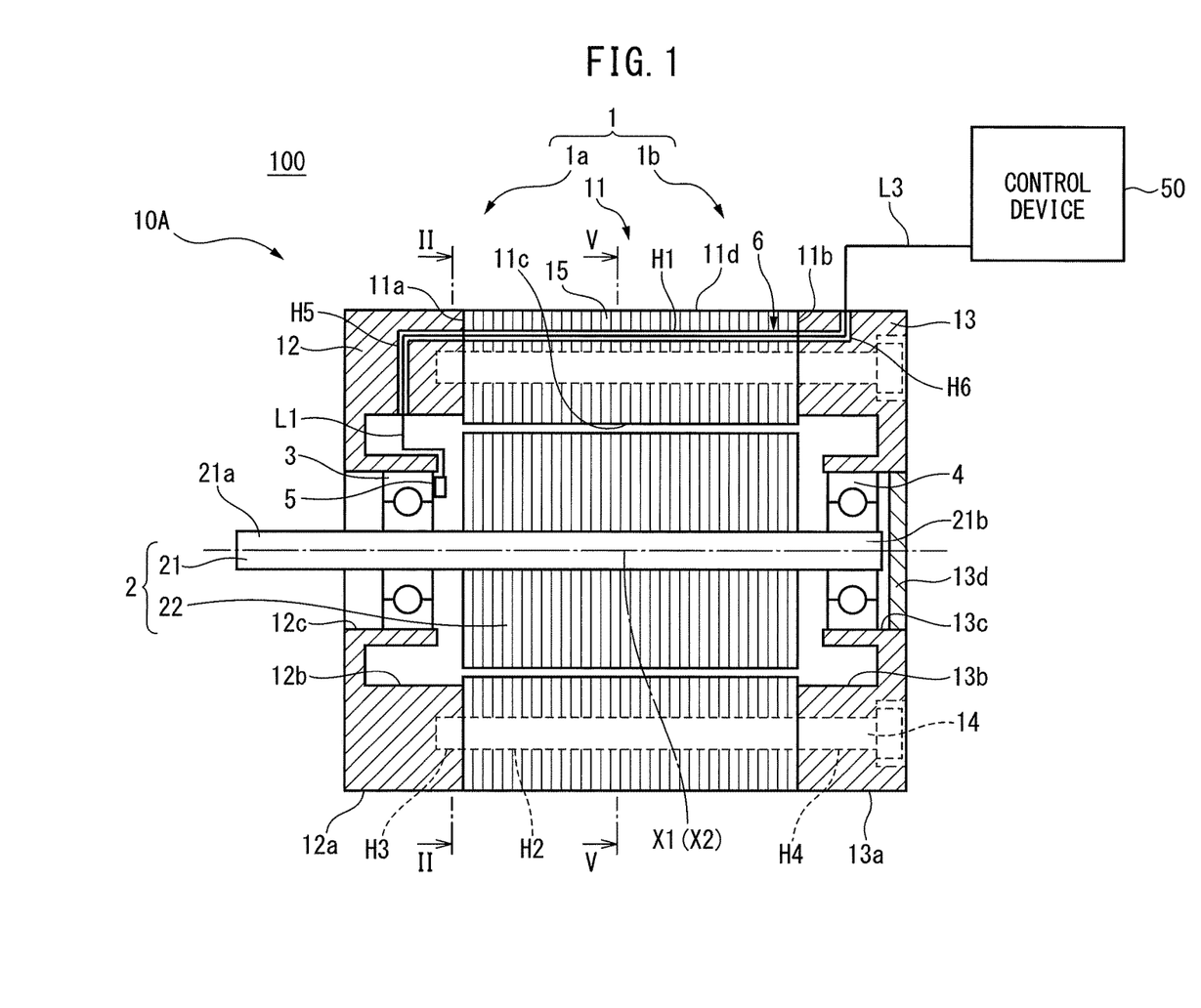
FIG. 1 is a schematic sectional view of a motor according to a first embodiment.
Figure 2:
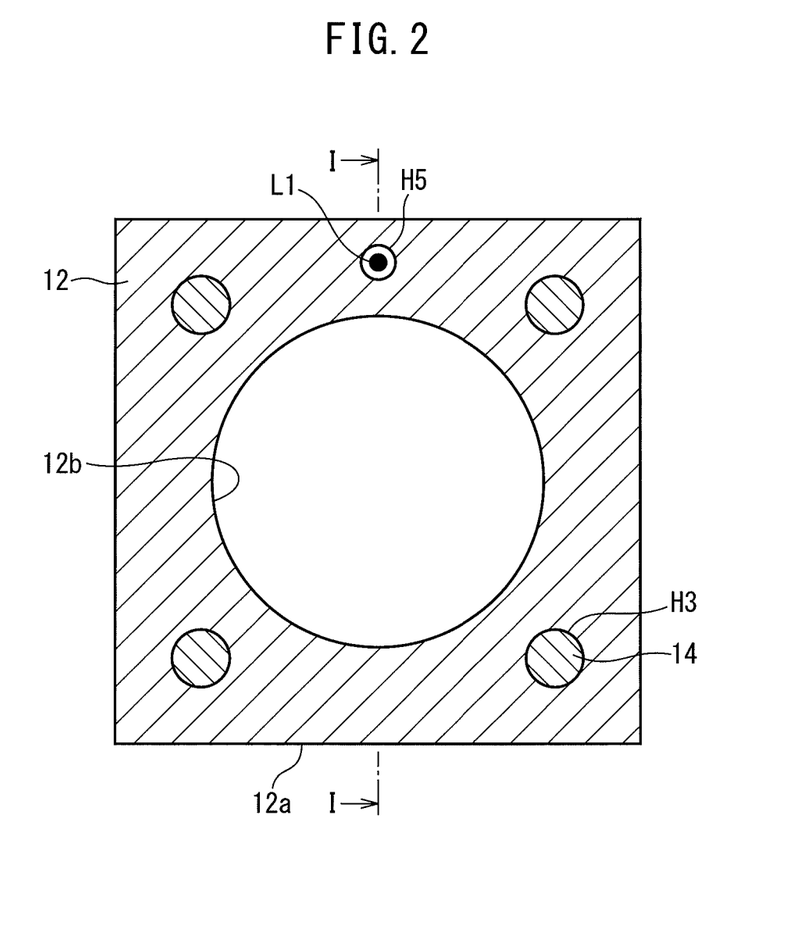
FIG. 2 is a sectional view taken on line II-II of FIG. 1.

FIG. 1 is a schematic sectional view of a motor according to a first embodiment, and FIG. 2 is a sectional view taken on line II-II of FIG. 1. FIG. 1 is a sectional view taken on line I-I of FIG. 2 (a sectional view along a central axis X2 of a shaft 21 of a rotor 2 described later).

Referring to FIG. 1, a motor 10A is connected to a control device 50. The motor 10A and the control device 50 constitute a motor system 100. The motor system 100 is used, for example, in a machine tool, an industrial machine, etc., but may be used in another type of machine. The motor system 100 may include other components, in addition to the motor 10A and the control device 50.

The motor 10A includes a stator unit 1, a rotor 2, a first bearing 3, a second bearing 4, a first sensor 5 and a guide path 6.

The stator unit 1 has a stator 11, a first housing 12, a second housing 13 and tie bolts 14. The stator 11 has a central axis X1. The components of the stator unit 1 are divided into two parts by the center of the stator 11 in the direction of the central axis X1. In other words, the components of the stator unit 1 are divided into a first portion 1a on a first side (left side of FIG. 1) and a second portion 1b on a second side (right side of FIG. 1) opposite the first side, along the central axis X1 of the stator 11. More specifically, the first portion 1a includes a part of the stator 11 on the first side, the first housing 12 and a part of each tie bolt 14 on the first side. The second portion 1b includes a part of the stator 11 on the second side, the second housing 13 and a part of each tie bolt 14 on the second side. In this embodiment, the first portion 1a has an output unit, while the second portion 1b has no output unit. However, as described later, for example, the first portion 1a may have no output unit, while the second portion 1b may have an output unit. In other words, the first bearing 3 and the first sensor 5 may be disposed on a non-output side. The first portion 1a and the second portion 1b may have or may not have an output unit. The tie bolts 14 are not necessarily required in the stator unit of the motor. As a method for connecting the stator 11, the first housing 12 and the second housing 13 without using the tie bolts 14, there is a method in which the stator is provided with an external frame, and the frame, the first housing 12 and the second housing 13 are connected by screwing or welding, etc.

The stator 11 has a stator core 15 and coils (not shown) wound on the stator core 15. The stator core 15 is made, for example, of a plurality of laminated magnetic steel sheets, but may be made of another material. Each magnetic steel sheet is hollow in cross section, and thus the stator 11 is hollow in shape.

The stator 11 has a first end surface 11a and a second end surface 11b in the direction of the central axis X1, an internal surface 11c and an external surface 11d. The stator 11 also has a through hole H1 and through holes H2. In this embodiment, the through hole H1 corresponds to a first through hole included in the guide path 6, and the through hole H2 corresponds to a second through hole through which the tie bolt 14 passes, as described later in detail. Referring to FIG. 2, the motor 10A has the plurality of (four in this embodiment) tie bolts 14, and accordingly the stator 11 has the plurality of through holes H2 (not shown in FIG. 2). As shown in FIG. 1, each of the through holes H1 and H2 extends from the first end surface 11a to the second end surface 11b.

The first housing 12 is attached on the stator 11, and supports the first bearing 3. To be more specific, the first housing 12 is attached on the first end surface 11a of the stator 11. The first housing 12 has an external surface 12a and an internal surface 12b. The internal surface 12b has a bearing attachment surface 12c. The bearing attachment surface 12c supports an outer rim of the first bearing 3.

The second housing 13 is attached on the stator 11, and supports the second bearing 4. To be more specific, the second housing 13 is attached on the second end surface 11b of the stator 11. The second housing 13 has an external surface 13a and an internal surface 13b. The internal surface 13b has a bearing attachment surface 13c. The bearing attachment surface 13c supports an outer rim of the second bearing 4. A lid 13d closes an opening delimitated by the bearing attachment surface 13c. The lid 13d is not necessarily required.

The tie bolts 14 connect the stator 11, the first housing 12 and the second housing 13 to each other. More specifically, the first housing 12 has screw holes H3. The stator 11 has the through holes H2, as described above. The second housing 13 has through holes H4. Each tie bolt 14 is engaged with the screw hole H3 of the first housing 12 through the through hole H4 of the second housing 13 and the through hole H2 of the stator 11.

Referring to FIG. 2, since the motor 10A has the plurality of (four in this embodiment) tie bolts 14, the first housing 12 and the second housing 13 have the plurality of screw holes H3 and the plurality of through holes H4 (not shown in FIG. 2), respectively.

As shown in FIG. 1, the rotor 2 has a shaft 21 and a rotor core 22. The rotor core 22 is inserted into the hollow stator 11 so as to form a gap therebetween. The shaft 21 is approximately cylindrical in shape, and has a central axis X2. The central axis X1 and the central axis X2 precisely or approximately coincide with each other. The shaft 21 has a first shaft portion 21a and a second shaft portion 21b. The first shaft portion 21a and the second shaft portion 21b protrude from the rotor core 22 in opposite directions to each other. More specifically, the first shaft portion 21a extends on the first side, while the second shaft portion 21b extends on the second side. In this embodiment, the first shaft portion 21a has the output unit of the motor 10A, and protrudes outside the stator unit 1. The second shaft portion 21b is present inside the stator unit 1, in this embodiment. The rotor core 22 is disposed around (radially outside) the shaft 21. The rotor core 22 is made, for example, of a plurality of laminated magnetic steel sheets, but may be made of another material.

The first bearing 3 and the second bearing 4 support the shaft 21 of the rotor 2. More specifically, the first bearing 3 is situated on the output side of the motor 10A, and rotatably supports the first shaft portion 21a of the shaft 21 in the first portion 1a of the stator unit 1. The second bearing 4 is situated on a side opposite the first bearing 3 across the rotor core 22 in the direction of the central axis X2 of the shaft 21, and rotatably supports the second shaft portion 21b of the shaft 21 in the second portion 1b of the stator unit 1. Inner rims of the first bearing 3 and the second bearing 4 are fitted onto an external surface of the shaft 21. Each of the first bearing 3 and the second bearing 4 is, for example, a rolling bearing such as a ball bearing, but may be another type of bearing.

The first sensor 5 measures a first parameter related to an operating state of the first bearing 3 in the first portion 1a of the stator unit 1. In this embodiment, the first sensor 5 is attached to the first bearing 3. The first sensor 5 is attached, for example, to the outer rim of the first bearing 3. The first sensor 5 may be attached in the vicinity of the first bearing 3, instead of being attached to the first bearing 3. The first sensor 5 may be attached, for example, to the first housing 12 e.g. the bearing attachment surface 12c, in the vicinity of the first bearing 3. In short, the first sensor 5 is attached so as to measure the first parameter. The first sensor 5 may be, for example, a vibration sensor, a sound sensor, a temperature sensor, an odor sensor, etc. The first parameter may be, for example, a parameter related to vibration (e.g. amplitude, frequency, etc.), a parameter related to sound (e.g. sound pressure, etc.), a temperature or a parameter related to odor (e.g. concentration of specific gas, etc.). The first sensor 5 has a first signal line L1 to output the measured first parameter.

The guide path 6 is provided in the stator unit 1, to guide the first signal line L1 of the first sensor 5 from the first portion 1a to the second portion 1b. In a different view, the guide path 6 extends from the first housing 12 to the second housing 13, when viewed in a radial direction of the shaft 21 passing through the guide path 6. In this embodiment, the guide path 6 is delimitated by the stator 11, the first housing 12 and the second housing 13. Thus, the guide path 6 guides the first signal line L1 of the first sensor 5 along the fixed path. To be more specific, the guide path 6 includes a through hole H5 formed in the first housing 12, the above-described through hole H1 formed in the stator 11 and a through hole H6 formed in the second housing 13.

The through hole H5 of the first housing 12 guides the first signal line L1 from the internal surface 12b of the first housing 12 to one end of the through hole H1 on the side of the first end surface 11a. The through hole H1 of the stator 11 guides the first signal line L1 from the first end surface 11a to the second end surface 11b. The through hole H6 of the second housing 13 guides the first signal line L1 from the other end of the through hole H1 on the side of the second end surface 11b to the external surface 13a of the second housing 13. Therefore, in this embodiment, the guide path 6 guides the first signal line L1 of the first sensor 5 from the inside of the first housing 12 to the second housing 13 through the through hole H5 and the through hole H1, and guides the first signal line L1 of the first sensor 5 to the outside of the second housing 13 through the through hole H6. The guide path 6 may not have the through hole H6 of the second housing 13, depending on the shapes of the first housing 12 and the second housing 13. In this case, the first signal line L1 that has passed through the through hole H1 of the stator 11 does not pass through the second housing 13. In other words, the guide path 6 may be delimited by at least one of the stator 11, the first housing 12 and the second housing 13. The through hole H1, the through hole H5 and the through hole H6 may be in various shapes, including e.g. round and polygonal, in cross section. In this embodiment, the guide path 6 guides the first signal line L1 of the first sensor 5 from the output side to the non-output side. However, for example, when the first bearing 3 and the first sensor 5 are disposed on the non-output side, the guide path 6 may guide the first signal line L1 of the first sensor 5 from the non-output side to the output side, and other situations are conceivable.

The first sensor 5 is electrically connected to the control device 50 through the first signal line L1. The first signal line L1 is electrically connected to the control device 50, for example, via a connector (not shown) provided on the external surface 13a of the second housing 13 and a signal line L3 connected to the connector, but may be connected to the control device 50 in another manner.

The control device 50 receives the first parameter outputted from the first sensor 5 through the signal lines L1 and L3. For example, when the first parameter indicates an abnormal value, the control device 50 stops the motor 10A. For example, when a temperature measured by the first sensor 5 exceeds an established threshold value, the control device 50 may determine that fixation may occur in the first bearing 3, and stop the motor 10A. For example, when a frequency or an amplitude measured by the first sensor 5 exceeds an established threshold value, the control device 50 may determine that flaking, etc., may occur in the first bearing 3, and stop the motor 10A. Note that, the first sensor 5 may be connected to a device other than the control device 50.

The motor 10A according to the first embodiment is provided with the guide path 6 for guiding the first signal line L1 of the first sensor 5 from the first portion 1a to the second portion 1b of the stator unit 1. In other words, the first signal line L1 of the first sensor 5 is guided to the side opposite the first bearing 3.

Figure 10:
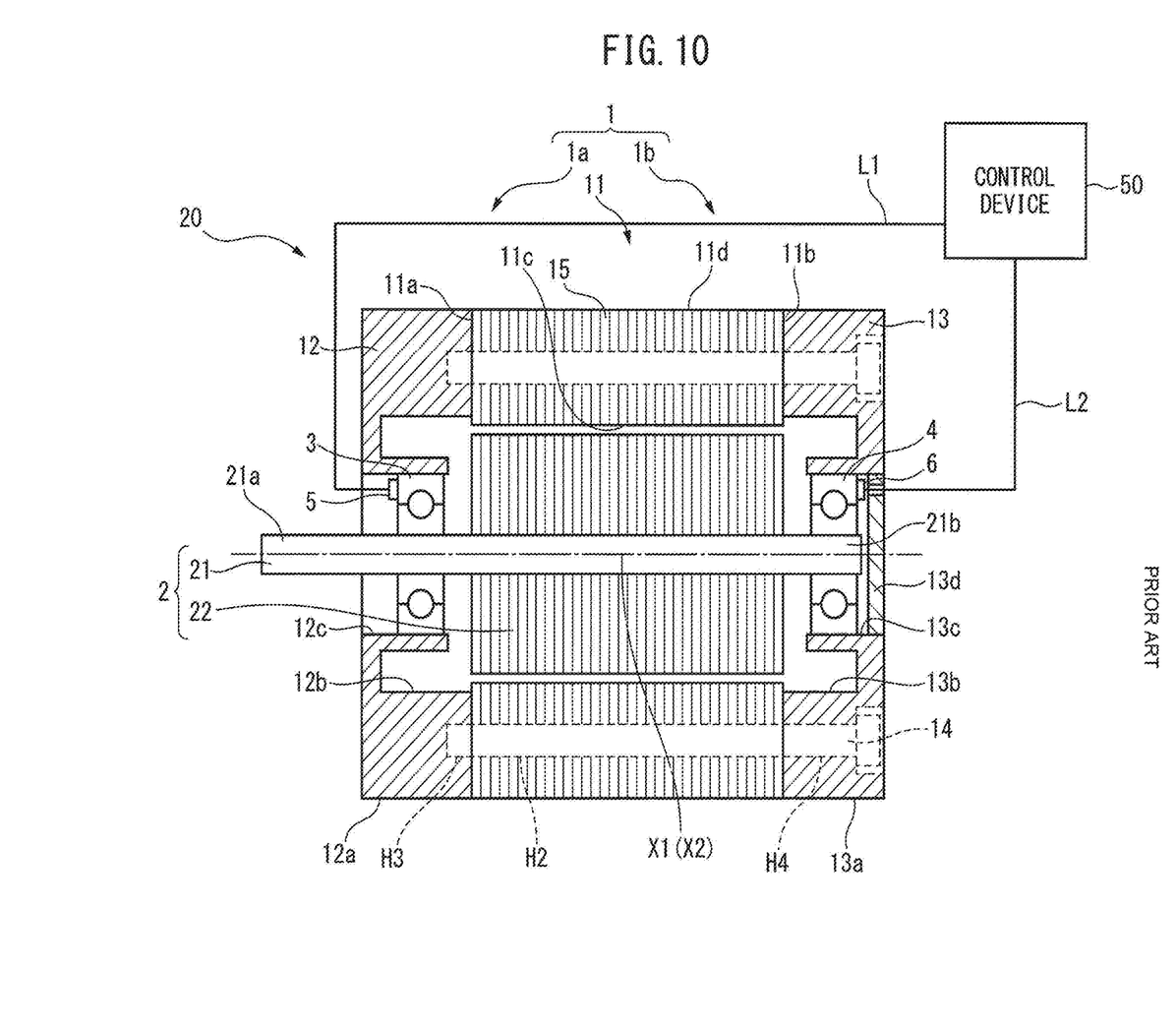
FIG. 10 is a schematic sectional view of a motor according to a reference example.

In contrast, FIG. 10 is a schematic sectional view of a motor according to a reference example. In the example, a motor 20 does not have the guide path 6 for guiding the first signal line L1 of the first sensor 5 to the side opposite the first bearing 3 across the rotor core 22.

Thus, in the motor 10A of FIG. 1, the length of the signal line an operator has to route is shorter than that of the motor 20 of FIG. 10 having no guide path. This facilitates wiring of the signal line L1.

Referring to FIG. 1, in the motor 10A according to the first embodiment, the stator unit 1 has the first housing 12 that is attached to the stator 11 and supports the first bearing 3, and the second housing 13 that is attached to the stator 11 and supports the second bearing 4. The stator 11 has the first through hole H1 that extends from the first end surface 11a on which the first housing 12 is attached to the second end surface 1ib on which the second housing 13 is attached. The guide path 6 includes the first through hole H1 of the stator 11. Therefore, since the first signal line L1 is enclosed with the through hole H1, the first signal line L1 is protected, for example, from cutting oil and swarf.

In the motor 10A, the guide path 6 further includes the through hole H5 formed in the first housing 12 and the through hole H6 formed in the second housing 13. Therefore, since the first signal line L1 is enclosed with the through holes H5 and H6, the first signal line L1 is protected, for example, from cutting oil and swarf. In this embodiment, in particular, since the first bearing 3 and the first sensor 5 are situated on the output side, the first housing 12 for supporting the first bearing 3 tends to contact cutting oil and swarf. Therefore, providing the through hole H5 in the first housing 12 effectively protects the first signal line L1 from the cutting oil and the swarf.

In the motor 10A, the stator unit 1 further includes the tie bolts 14 for connecting the stator 11, the first housing 12 and the second housing 13 to each other. The stator 11 has the second through holes H2 that extend from the first end surface 11a to the second end surface 11b. The tie bolts 14 pass through the second through holes H2 of the stator 11. In other words, the through hole H1, which passes the first signal line L1 therethrough, and the through holes H2, which pass the tie bolts 14 therethrough, are independent of each other. Thus, the first signal line L1 is treated as being independent of the tie bolts 14.

Figure 3:
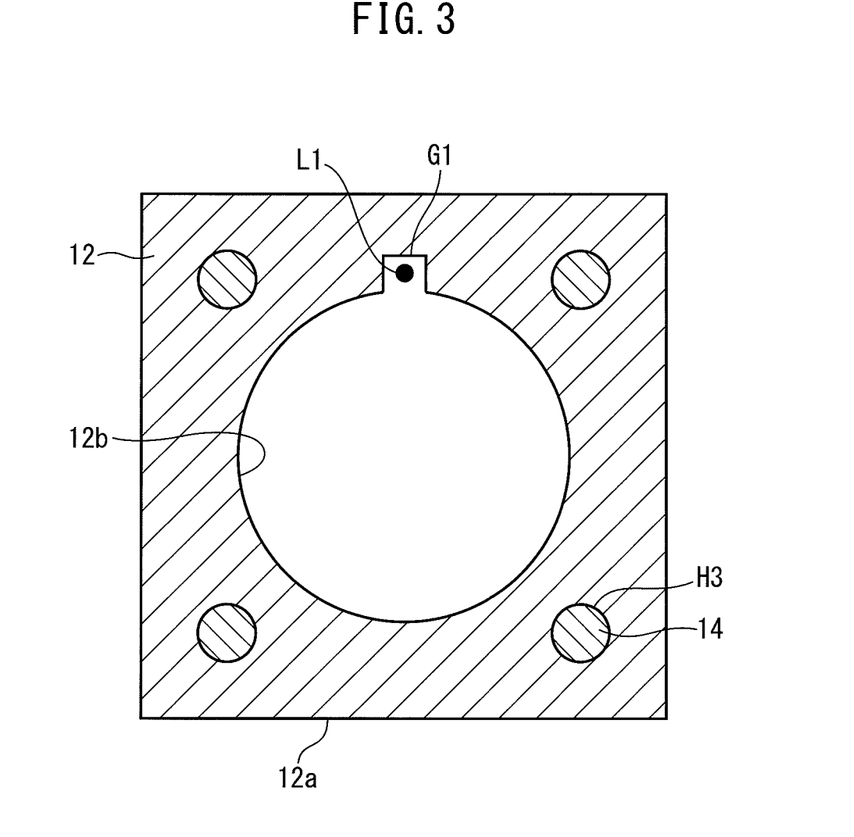
FIG. 3 is a sectional view showing a modification example of FIG. 2.
Figure 4:
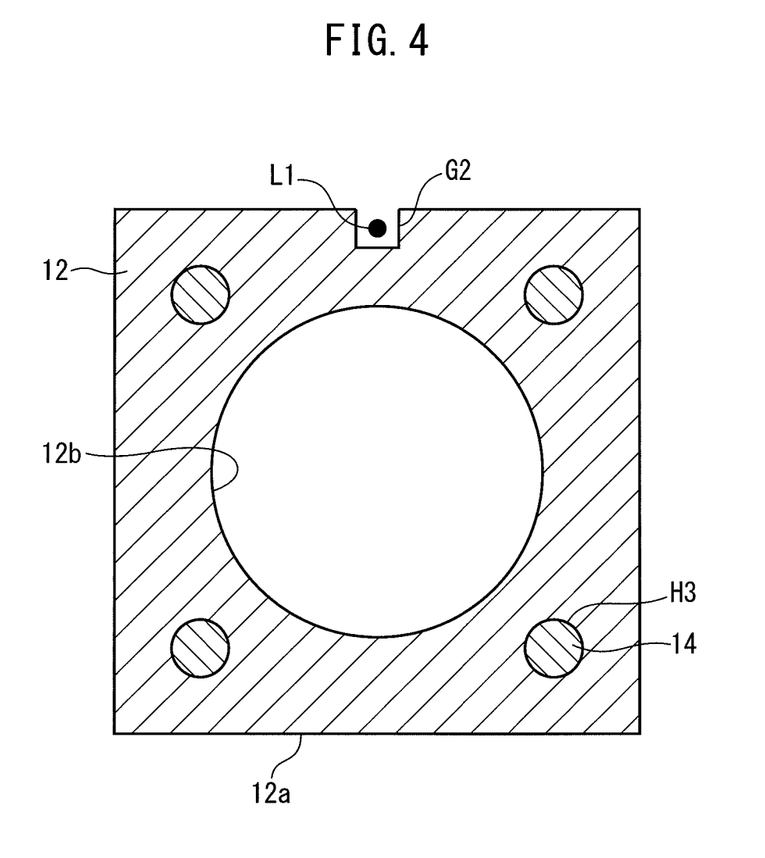
FIG. 4 is a sectional view showing another modification example of FIG. 2.
Figure 5:
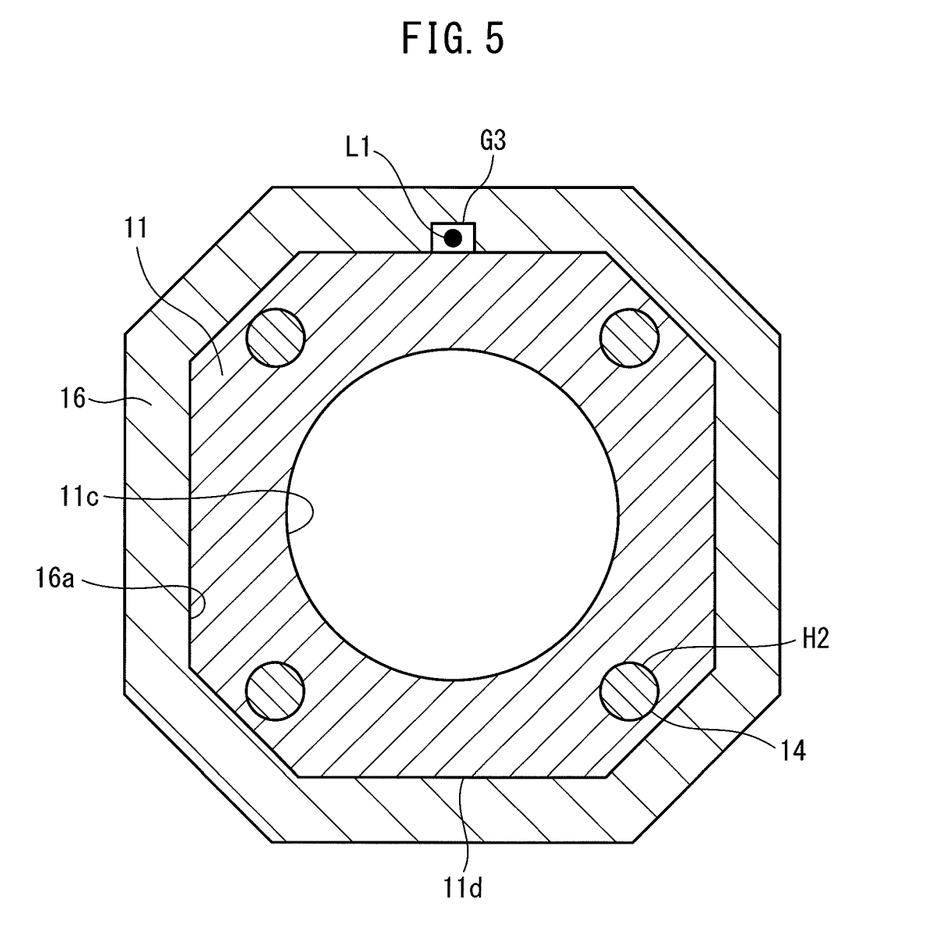
FIG. 5 is a sectional view showing yet another modification example of FIG. 2.

The guide path 6 may be in various states. FIGS. 3 to 5 are sectional views showing modification examples of FIG. 2.

Referring to FIG. 3, in this example, the guide path 6 includes a groove G1. The groove G1 is delimited by the first housing 12, the stator 11 (not shown in FIG. 3) and the second housing 13 (not shown in FIG. 3). More specifically, the groove G1 is formed in the internal surface 12b of the first housing 12, the internal surface 11c of the stator 11 and the internal surface 13b of the second housing 13. In this case, since the groove G1 encloses the first signal line L1, the first signal line L1 is protected, for example, from cutting oil and swarf.

Referring to FIG. 4, in this example, the guide path 6 includes a groove G2. The groove G2 is delimited by the first housing 12, the stator 11 (not shown in FIG. 4) and the second housing 13 (not shown in FIG. 4). More specifically, the groove G2 is formed in the external surface 12a of the first housing 12, the external surface 11d of the stator 11 and the external surface 13a of the second housing 13. In this case, the first signal line L1 is routed easily. To protect the first signal line L1, for example, from cutting oil and swarf, the groove G2 may be filled with, for example, a resin, etc., so as to cover the first signal line L1 with the resin.

FIG. 5 is a sectional view taken on line V-V of FIG. 1. Note that, FIG. 5 omits an internal portion of the stator 11 having teeth, the rotor 2, etc. Referring to FIG. 5, in this example, the stator unit 1 further includes a third housing 16. The third housing 16 covers the external surface 11d of the stator 11. The third housing 16 may function, for example, as a cover for heat dissipation. The guide path 6 includes a groove G3 formed in an internal surface 16a of the third housing 16, instead of the through hole H1 formed in the stator 11. The third housing 16 and the stator 11 delimitate a cross section having the groove G3. In this case, since the groove G3 encloses the first signal line L1, the first signal line L1 is protected, for example, from cutting oil and swarf. The guide path 6 may include a through hole formed in the third housing 16, instead of the groove G3. The above-described grooves G1, G2 and G3 may be in various shapes, for example, including the shape of the letter U, the shape of the letter V and semi-circle in cross section.

Figure 6:
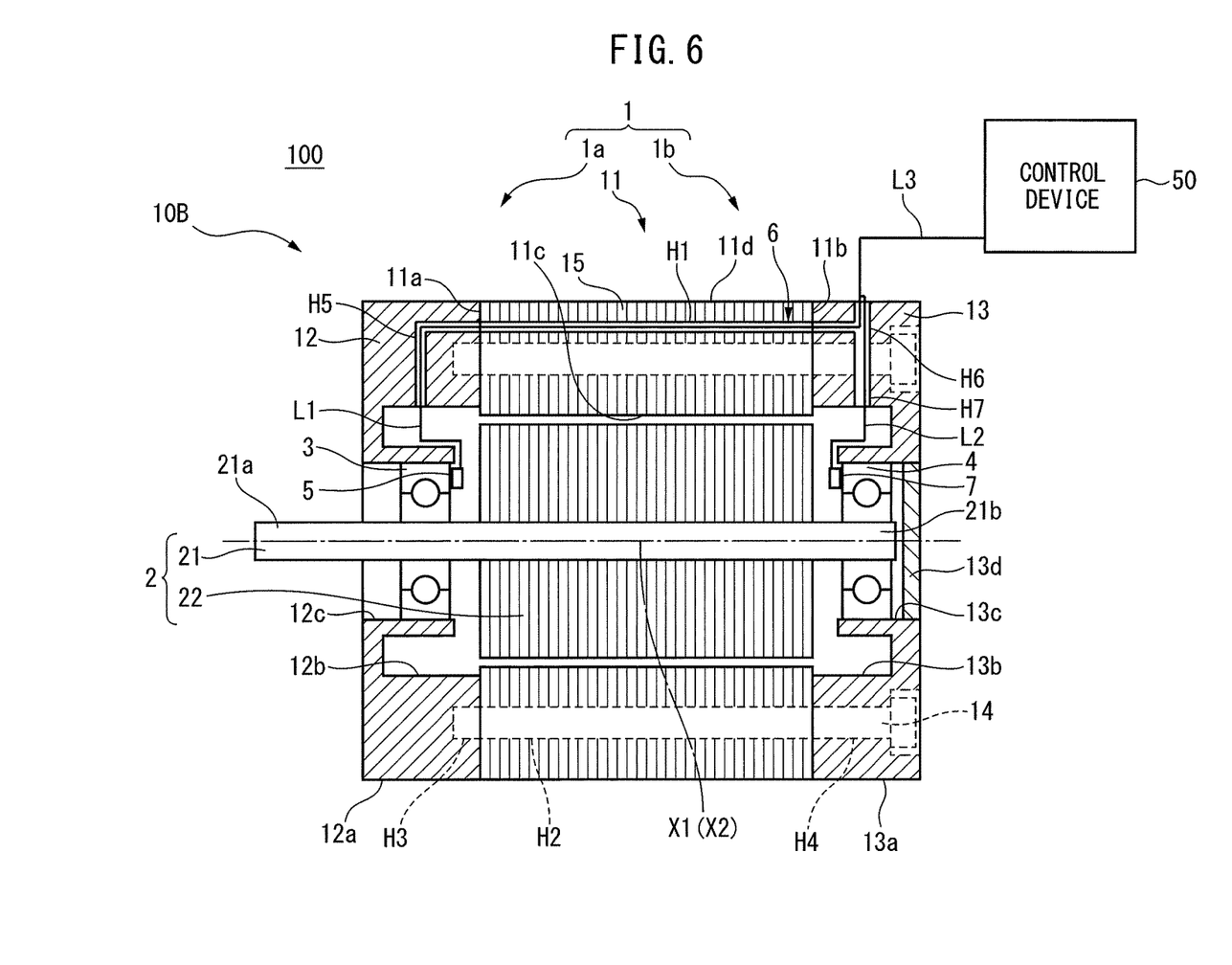
FIG. 6 is a schematic sectional view of a motor according to a second embodiment.

Then, FIG. 6 is a schematic sectional view of a motor according to a second embodiment. The difference between a motor 10B according to the second embodiment and the motor 10A (see FIG. 1) according to the first embodiment is that the motor 10B has a second sensor 7.

The second sensor 7 measures a second parameter related to an operating state of the second bearing 4 in the second portion 1b of the stator unit 1. In this embodiment, the second sensor 7 is attached to the second bearing 4. The second sensor 7 is attached, for example, to an outer rim of the second bearing 4. The second sensor 7 may be attached in the vicinity of the second bearing 4, instead of being attached to the second bearing 4. The second sensor 7 may be attached, for example, to the second housing 13 e.g. the bearing attachment surface 13c, in the vicinity of the second bearing 4. In short, the second sensor 7 is attached so as to measure the second parameter. The second sensor 7 may be, for example, a vibration sensor, a sound sensor, a temperature sensor, an odor sensor, etc. The second parameter may be, for example, a parameter related to vibration (e.g. amplitude, frequency, etc.), a parameter related to sound (e.g. sound pressure, etc.), a temperature or a parameter related to odor (e.g. concentration of specific gas, etc.). The second sensor 7 has a second signal line L2 to output the measured second parameter.

The first signal line L1 of the first sensor 5 and the second signal line L2 of the second sensor 7 converge on the same position in the second portion 1b of the stator unit 1. In this embodiment, the first signal line L1 and the second signal line L2 converge on the same position on a surface, more specifically, on the external surface of the second housing 13. To be more specific, the guide path 6 further includes a through hole H7 formed in the second housing 13. The through hole H7 guides the second signal line L2 from the internal surface 13b of the second housing 13 to the external surface 13a of the second housing 13. For example, the through hole H7 joins with the through hole H6 in its middle. The first signal line L1 of the first sensor 5 and the second signal line L2 of the second sensor 7 are connected together, for example, to a connector (not shown) provided on the external surface 13a of the second housing 13. The first signal line L1 of the first sensor 5 and the second signal line L2 of the second sensor 7 may converge on the same position inside the second housing 13, instead of converging on the same position on the surface of the second housing 13. The signal lines L1 and L2 that have converged on the same position are electrically connected to the control device 50, for example, through the signal line L3 connected to the connector, but may be connected to the control device 50 in another manner. The control device 50 receives the first parameter outputted from the first sensor 5 through the signal lines L1 and L3, and receives the second parameter outputted from the second sensor 7 through the signal lines L2 and L3. In this embodiment, the first signal line L1 of the first sensor 5 and the second signal line L2 of the second sensor 7 converge on the same position on the non-output side. However, for example, when the second portion 1b has an output unit, the first signal line L1 of the first sensor 5 and the second signal line L2 of the second sensor 7 may converge on the same position on the output side.

For example, when at least one of the first parameter and the second parameter indicates an abnormal value, the control device 50 stops the motor 10B. For example, when a temperature measured by at least one of the first sensor 5 and the second sensor 7 exceeds an established threshold value, the control device 50 may determine that fixation may occur in the corresponding bearing, and stop the motor 10B. For example, when a frequency or an amplitude measured by at least one of the first sensor 5 and the second sensor 7 exceeds an established threshold value, the control device 50 may determine that flaking, etc., may occur in the corresponding bearing, and stop the motor 10B.

The motor 10B according to the second embodiment has approximately the same effects as the motor 10A according to the first embodiment. In addition, the motor 10B includes the second sensor 7 that measures the second parameter related to the operating state of the second bearing 4 in the second portion 1b of the stator unit 1, and has the second signal line L2 for outputting the second parameter. In the motor 10B, the first signal line L1 and the second signal line L2 converge on the same position in the second portion 1b of the stator unit 1. This structure facilitates connecting the two sensors 5 and 7 to the device.

In contrast, in the motor 20 according to the reference example of FIG. 10, the signal lines L1 and L2 do not converge on the same position in the second portion 1b of the stator unit 1. Thus, connecting the first sensor 5 and the second sensor 7 to the device puts an increased load on the operator.

Figure 7:
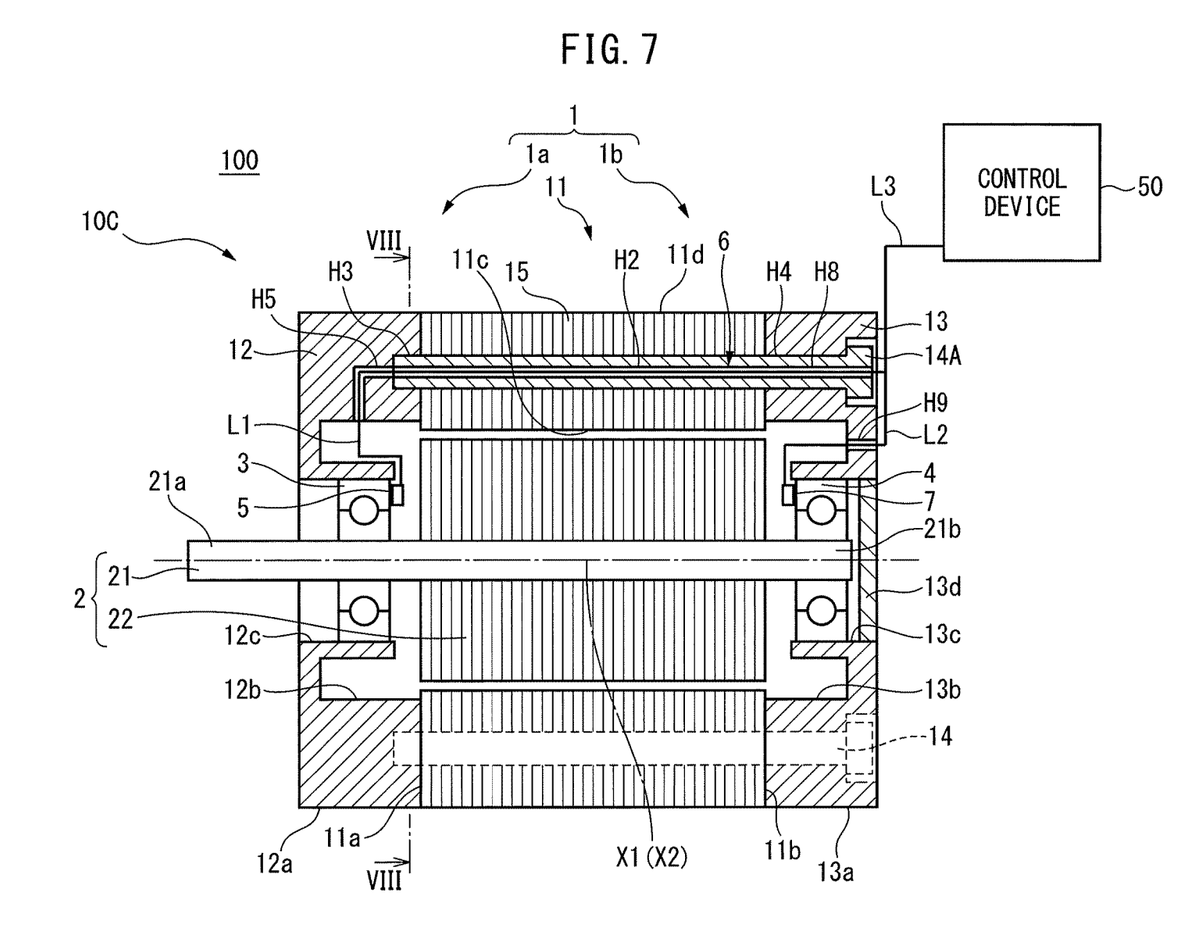
FIG. 7 is a schematic sectional view of a motor according to a third embodiment.
Figure 8:
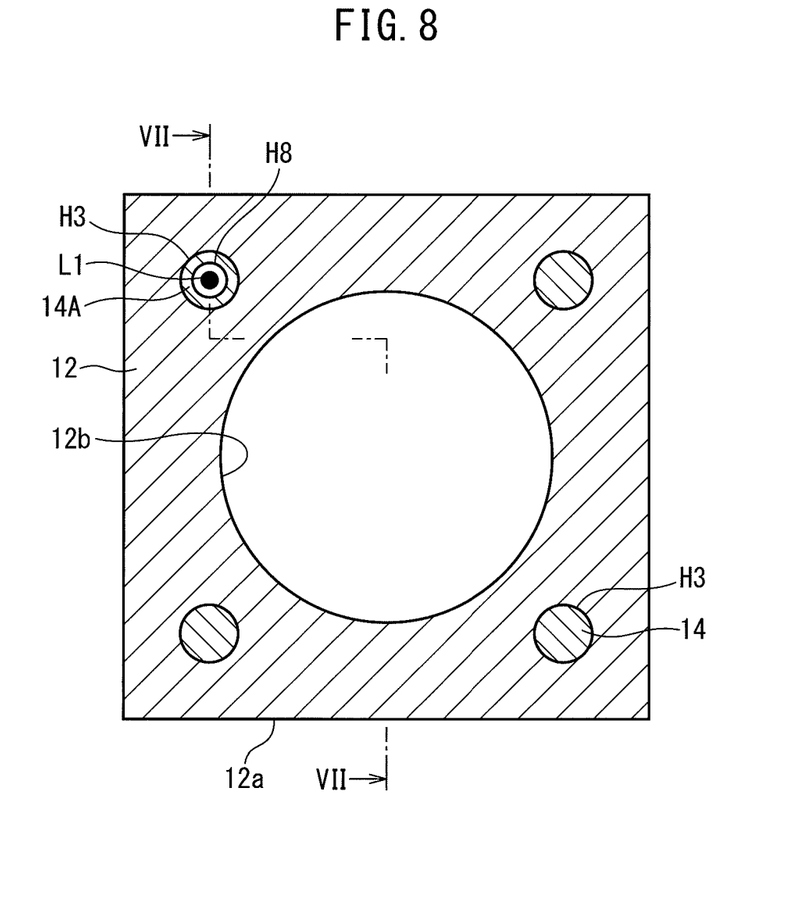
FIG. 8 is a sectional view taken on line VIII-VIII of FIG. 7.

Then, FIG. 7 is a schematic sectional view of a motor according to a third embodiment, and FIG. 8 is a sectional view taken on line VIII-VIII of FIG. 7. FIG. 7 is a sectional view taken ln line VII-VII of FIG. 8 (a sectional view along the central axis X2 of the shaft 21 of the rotor 2, though its upper portion is a sectional view along a central axis of a tie bolt 14A having a through hole H8, as described later).

Referring to FIG. 7, the difference between an motor 10C according to the third embodiment and the motor 10B (see FIG. 6) according to the second embodiment is that one tie bolt 14A of the tie bolts has a through hole H8, and the first signal line L1 of the first sensor 5 passes through the through hole H8 of the tie bolt 14A. In short, in this embodiment, the guide path 6 includes the through hole H8 of the tie bolt 14A.

To be more specific, in this embodiment, the guide path 6 is delimitated by the first housing 12 and the tie bolt 14A. The guide path 6 includes the through hole H5 formed in the first housing 12 and the through hole H8 formed in the tie bolt 14A. Thus, the guide path 6 guides the first signal line L1 of the first sensor 5 along the fixed path. In a different view, the guide path 6 extends from the first housing 12 to the second housing 13, when viewed in a radial direction of the shaft 21 passing through the guide path 6.

The through hole H8 of the tie bolt 14A extends from one end to the other end of the tie bolt 14A along a central axis of the tie bolt 14A. The through hole H8 may be in various shapes, including e.g. round and polygonal, in cross section.

The first signal line L1 of the first sensor 5 and the second signal line L2 of the second sensor 7 converge on the same position in the second portion 1b of the stator unit 1. In this embodiment, the first signal line L1 and the second signal line L2 converge on the same position on a surface, more specifically, on the external surface of the second housing 13. To be more specific, the second housing 13 has a through hole H9. The through hole H9 guides the second signal line L2 from the internal surface 13b of the second housing 13 to the external surface 13a of the second housing 13. The first signal line L1 of the first sensor 5 and the second signal line L2 of the second sensor 7 are connected together, for example, to a connector (not shown) provided on the external surface 13a of the second housing 13. The signal lines L1 and L2 that have converged on the same position are electrically connected to the control device 50, for example, through the signal line L3 connected to the connector, but may be connected to the control device 50 in another manner.

The motor 10C according to the third embodiment has approximately the same effects as the motor 10B according to the second embodiment. In addition, in the motor 10C, the stator unit 1 has the first housing 12 that is attached on the stator 11 and supports the first bearing 3, the second housing 13 that is attached on the stator 11 and supports the second bearing 4, and the tie bolt 14A for connecting the stator 11, the first housing 12 and the second housing 13 to each other. The tie bolt 14A has the through hole H8 that extends along the central axis of the tie bolt 14A. The guide path 6 includes the through hole H8 of the tie bolt 14A. In this case, since the through hole H8 of the tie bolt 14A can be used as the guide path, there is no need for any modification to the stator 11.

Figure 9:
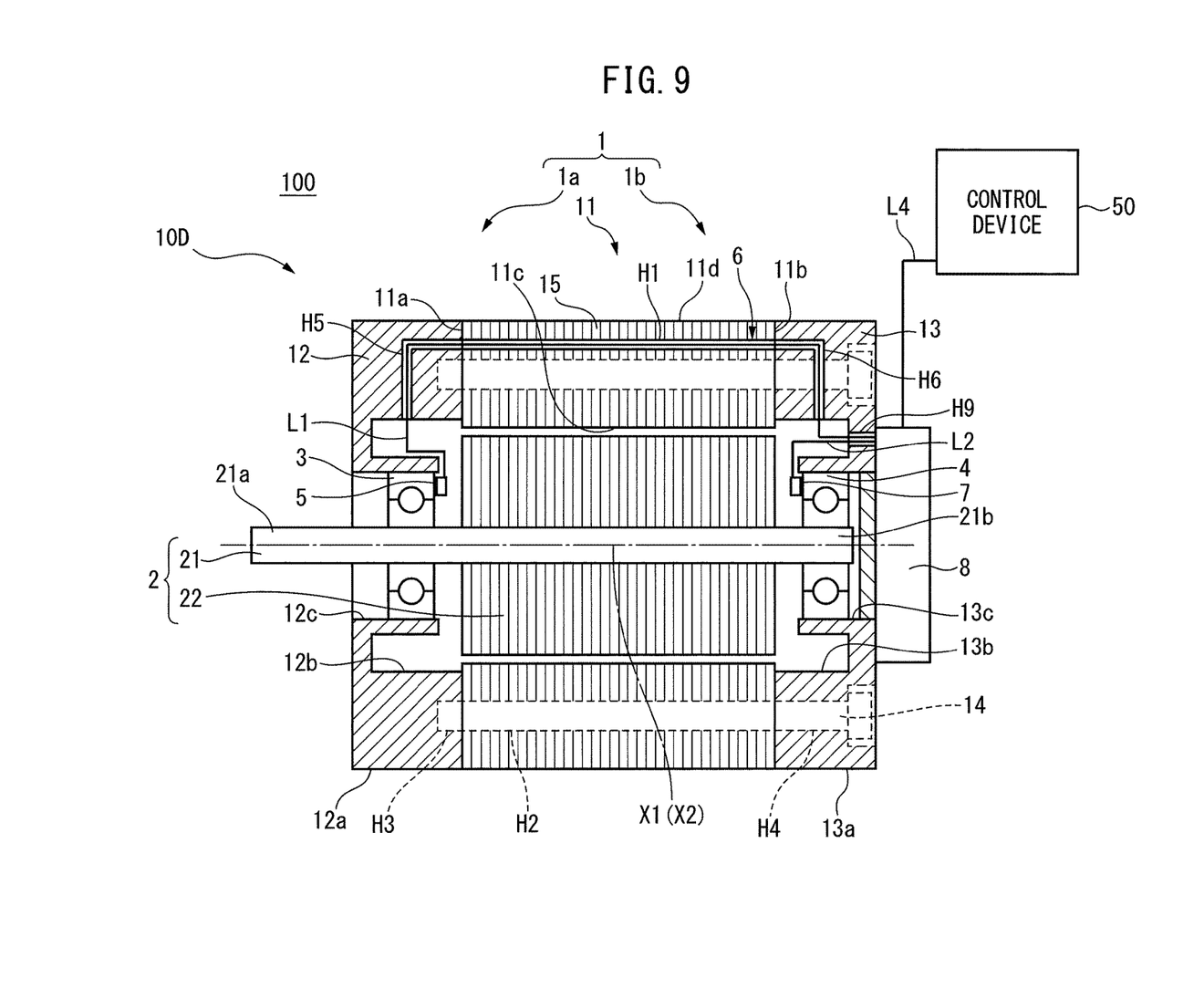
FIG. 9 is a schematic sectional view of a motor according to a fourth embodiment.

Then, FIG. 9 is a schematic sectional view of a motor according to a fourth embodiment. The difference between a motor 10D according to the fourth embodiment and the motor 10B (see FIG. 6) according to the second embodiment is that the motor 10D further includes a rotation detector 8, and the first signal line L1 of the first sensor 5 and the second signal line L2 of the second sensor 7 are connected to the rotation detector 8. Note that, the motor 10D may include any one of a combination of the first sensor 5 and the first signal line L1 and a combination of the second sensor 7 and the second signal line L2, and the rotation detector 8.

The rotation detector 8 detects the rotation of the rotor 2 in the second portion 1b of the stator unit 1. More specifically, the rotation detector 8 is attached on the external surface 13a of the second housing 13 so as to close the opening delimitated by the bearing attachment surface 13c. The rotation detector 8 detects, for example, the number of rotations of the rotor 2 at the second shaft portion 21b of the shaft 21.

The first signal line L1 of the first sensor 5 and the second signal line L2 of the second sensor 7 converge on the same position in the second portion 1b of the stator unit 1. In this embodiment, the first signal line L1 and the second signal line L2 converge on the same position on a surface, more specifically, on the external surface of the second housing 13. To be more specific, the through hole H6 of the second housing 13 guides the first signal line L1 from the end of the through hole H1 on the side of the second end surface 11b to the internal surface 13b of the second housing 13. The second housing 13 has a through hole H9. The through hole H9 guides the signal lines L1 and L2 from the internal surface 13b of the second housing 13 to the external surface 13a of the second housing 13.

The first signal line L1 and the second signal line L2 are connected to the rotation detector 8. The first signal line L1 and the second signal line L2 may converge on the same position on the internal surface of the second housing 13 or inside the second housing 13, instead of converging on the same position on the external surface of the second housing 13, and then be connected to the rotation detector 8. The rotation detector 8 is connected to the control device 50 through a signal line L4, and outputs the first parameter received from the first sensor 5, the second parameter received from the second sensor 7 and the detected rotation of the rotor 2 to the control device 50 through the signal line L4.

The motor 10D according to the fourth embodiment has approximately the same effects as the motor 10B according to the second embodiment. In addition, the motor 10D includes the rotation detector 8 that detects the rotation of the rotor 2 in the second portion 1b of the stator unit 1. The first signal line L1 of the first sensor 5 is connected to the rotation detector 8, and the rotation detector 8 outputs the first parameter and the detected rotation. Therefore, the first sensor 5 can be connected to the device using the signal line L4 of the rotation detector 8, without the need for adding a new signal line.

The second signal line L2 of the second sensor 7, in addition to the first signal line L1, is connected to the rotation detector 8, and the rotation detector 8 outputs the second parameter, in addition to the first parameter and the detected rotation. Therefore, the second sensor 7 can be connected to the device using the signal line L4 of the rotation detector 8, without the need for adding a new signal line. Furthermore, the two sensors 5 and 7 can be easily connected to the device using the signal line L4 of the rotation detector 8.

The embodiments of the motor are described above, but the present invention is not limited to the above embodiments. It is apparent for those skilled in the art that the above embodiments can be variously modified. It is also apparent for those skilled in the art that a feature included in one of the embodiments can be combined into another of the embodiments, or can be exchanged for a feature included in another of the embodiments, as long as no contradiction arises.

What is claimed is:

1. A motor comprising:
    a stator unit having a stator;
    a rotor having a rotor core inserted into the stator so as to form a gap, and a shaft including a first shaft portion and a second shaft portion, each protruding from the rotor core in opposite directions;
    a first bearing for rotatably supporting the first shaft portion of the shaft in a first portion of the stator unit;
    a second bearing for rotatably supporting the second shaft portion of the shaft in a second portion of the stator unit;
    a first sensor for measuring a first parameter related to an operating state of the first bearing in the first portion of the stator unit, the first sensor having a first signal line for outputting the first parameter; and
    a guide path provided in the stator unit, for guiding the first signal line from the first portion to the second portion;
    wherein the stator unit includes a first housing attached on the stator, for supporting the first bearing, and a second housing attached on the stator, for supporting the second bearing,
    the stator has a first through hole extending from a first end surface on which the first housing is attached to a second end surface on which the second housing is attached, and
    the guide path includes the first through hole of the stator.

2. The motor according to claim 1, further comprising:
    a second sensor for measuring a second parameter related to an operating state of the second bearing in the second portion of the stator unit, the second sensor having a second signal line for outputting the second parameter, wherein
    the first signal line and the second signal line converge on the same position in the second portion of the stator unit.

3. The motor according to claim 2, further comprising:
    a rotation detector for detecting the rotation of the rotor in the second portion of the stator unit, wherein the first signal line and the second signal line are connected to the rotation detector, and the rotation detector outputs the first parameter, the second parameter and the detected rotation.

4. The motor according to claim 1, further comprising:
a rotation detector for detecting the rotation of the rotor in the second portion of the stator unit, wherein
the first signal line is connected to the rotation detector, and
the rotation detector outputs the first parameter and the detected rotation.

5. The motor according to claim 1, wherein
the stator unit further includes a tie bolt for connecting the stator, the first housing and the second housing to each other;
the stator includes a second through hole extending from the first end surface to the second end surface; and
the tie bolt passes through the second through hole of the stator.

6. The motor according to claim 1,
further comprising a tie bolt for connecting the stator, the first housing and the second housing to each other;
the tie bolt has a through hole extending along a central axis of the tie bolt; and
the guide path includes the through hole of the tie bolt.

7. The motor according to claim 1, wherein the guide path includes a groove formed in an internal surface of the stator.

8. The motor according to claim 1, wherein the guide path includes a groove formed in an external surface of the stator.

9. The motor according to claim 1, wherein
the stator unit has a third housing for covering an external surface of the stator; and
the guide path includes a groove formed in an internal surface of the third housing.

10. A motor comprising:
a stator unit having a stator;
a rotor having a rotor core inserted into the stator so as to form a gap, and a shaft including a first shaft portion and a second shaft portion, each protruding from the rotor core in opposite directions;
a first bearing for rotatably supporting the first shaft portion of the shaft in a first portion of the stator unit;
a second bearing for rotatably supporting the second shaft portion of the shaft in a second portion of the stator unit;
a first sensor for measuring a first parameter related to an operating state of the first bearing in the first portion of the stator unit, the first sensor having a first signal line for outputting the first parameter; and
a guide path provided in the stator unit, for guiding the first signal line from the first portion to the second portion;
wherein the stator unit includes a first housing attached on the stator, for supporting the first bearing, a second housing attached on the stator, for supporting the second bearing, and a tie bolt for connecting the stator, the first housing and the second housing to each other;
the tie bolt has a through hole extending along a central axis of the tie bolt; and
the guide path includes the through hole of the tie bolt.

11. The motor according to claim 10, further comprising:
a second sensor for measuring a second parameter related to an operating state of the second bearing in the second portion of the stator unit, the second sensor having a second signal line for outputting the second parameter, wherein
the first signal line and the second signal line converge on the same position in the second portion of the stator unit.

12. The motor according to claim 11, further comprising:
a rotation detector for detecting the rotation of the rotor in the second portion of the stator unit, wherein
the first signal line and the second signal line are connected to the rotation detector, and
the rotation detector outputs the first parameter, the second parameter and the detected rotation.

13. The motor according to claim 10, further comprising:
a rotation detector for detecting the rotation of the rotor in the second portion of the stator unit, wherein
the first signal line is connected to the rotation detector, and
the rotation detector outputs the first parameter and the detected rotation.

14. The motor according to claim 10, wherein
the stator has a first through hole extending from a first end surface on which the first housing is attached to a second end surface on which the second housing is attached, and
the guide path includes the first through hole of the stator.

15. The motor according to claim 14, wherein
the stator includes a second through hole extending from the first end surface to the second end surface; and
the tie bolt passes through the second through hole of the stator.

16. The motor according to claim 10, wherein the guide path includes a groove formed in an internal surface of the stator.

17. The motor according to claim 10, wherein the guide path includes a groove formed in an external surface of the stator.

18. The motor according to claim 10, wherein
the stator unit has a third housing for covering an external surface of the stator; and
the guide path includes a groove formed in an internal surface of the third housing.

* * * * *